(No Model.)

F. OVERN.
PROCESS OF EMBEDDING WIRE NETTING IN GLASS.

No. 516,220. Patented Mar. 13, 1894.

Witnesses:
John E. Parker
J. Henderson

Inventor:
Frank Overn,
by his Attorney,
Horace Pettit

UNITED STATES PATENT OFFICE.

FRANK OVERN, OF PHILADELPHIA, PENNSYLVANIA, ASSIGNOR OF TWO-THIRDS TO JOHN OVERN, JR., AND HORACE PETTIT, OF SAME PLACE.

PROCESS OF EMBEDDING WIRE-NETTING IN GLASS.

SPECIFICATION forming part of Letters Patent No. 516,220, dated March 13, 1894.

Application filed October 9, 1893. Serial No. 487,557. (No specimens.)

*To all whom it may concern:*

Be it known that I, FRANK OVERN, a citizen of the United States, and a resident of the city of Philadelphia and State of Pennsylvania, have invented a certain new and useful Process of Embedding Wire-Netting in Glass, of which the following is a full, clear, and exact description, reference being had to the accompanying drawings, forming part of this specification.

My invention relates to an improved process of manufacturing sheets or plates of glass having embedded therein wire or wire netting, and ordinarily known as "wire glass." Sheets of glass of this character are especially valuable in skylights, vaults, for port holes of vessels, &c., where strength is required.

My application for Letters Patent for apparatus for embedding wire netting in glass is filed of even date herewith, Serial No. 487,558.

Figure 1:
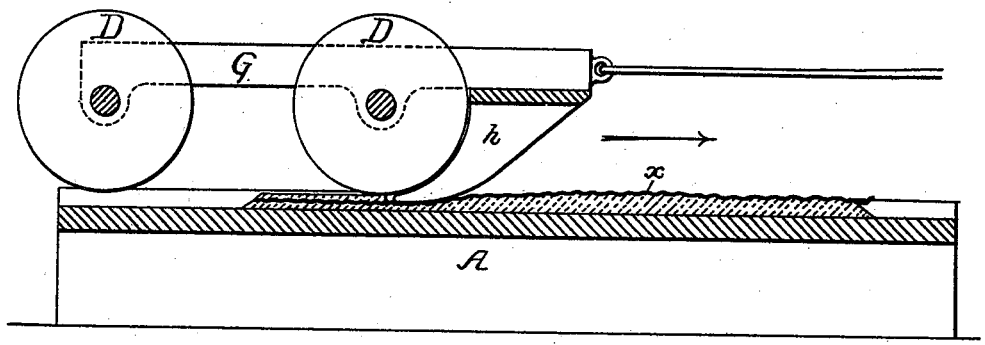
Figure 2:
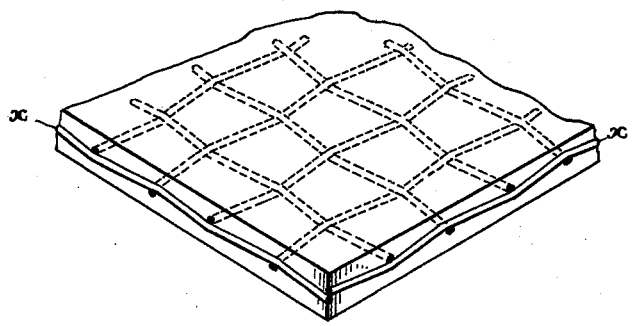

In the accompanying drawings:—Figure 1 is a longitudinal sectional elevation of a machine which may be employed to carry my improved process into effect. Fig. 2 is a perspective view illustrating a section of the manufactured glass.

In the manufacturing of wire glass as has been hitherto practiced various processes have been employed, one of which, for instance, consists in heating to about the fusing point, two sheets of manufactured glass; then placing between them the wire netting and finally rolling the two sheets together. Another method consists in first rolling a sheet of glass to the required thickness, then pressing into the sheet from one face the wire gauze or netting and finally passing a roller over the sheet to close the openings made by the entrance of the wire netting. Also other methods have been known materially different from my process herein described. In these methods in the manufacture of the sheet, in the first instance, it is difficult to produce as finished a result, imperfect fusion is apt to occur, large sheets cannot readily be produced, and more work is required; the second method has been found objectionable in that the passage of a roller over a quantity of molten glass to form a sheet will necessarily partially cool the glass and form a slight skin upon the upper surface which must be broken when the wire netting is forced into the same, this being particularly dangerous to the strength of the glass where the sheet is made thin enough for lights, or when the surface of the sheet is to be finished and polished. A further objection to this method when heated wire is employed is that in order to introduce the wire gauze between the first and second rollers it must be placed upon a chute or guide upon the carrier which requires time and exposes the fine wire strands of the previously heated wire gauze or netting to the cooling atmosphere before it is embedded in the glass.

In other methods the wire is not as readily and effectually embedded and requires a greater amount of labor.

In carrying out my invention, therefore, I propose to overcome these objections by embedding the wire netting in the glass partially of its own weight by first laying the sheet of wire netting upon the glass before rolling the same into a sheet and then forcing the wire fully beneath the surface of the glass and toward the center by passing over the wire a series of embedding plates and then rolling the glass, and to this end I have devised this process which may be carried into effect by various mechanisms.

The molten glass is first poured fairly evenly upon a table provided for the purpose; the wire $x$, preferably previously heated, is then, as shown in Fig. 1, laid upon the molten glass and embedded into the glass to the desired depth before the surface is rolled or chilled; the smoothing roller, or rollers, are then passed over the molten glass in which the wire is embedded and is rolled to the proper thickness. The wire being introduced practically as soon as the glass is poured upon the table and before rolling, is more easily embedded, and at the same time, the glass being still in its unpressed and unchilled state, the portions of glass above and through which the wire has been forced will quite readily flow together again and cohere to a large extent after the wire is in position and the subsequent smoothing roll therefore has less work to perform and consequently accomplishes better results.

The preferable constructions of mechanisms which may be employed in carrying out my invention are illustrated in the accompanying drawings.

In Fig. 1, A represents a suitable table, or plate, upon which the molten glass is poured from the melting pot or furnace. Above this table is a frame, G, in which are journaled one or more pressing rollers, D, and immediately in front of the pressing roller, or the forward pressing roller where more than one is employed, is a series of blades, h, having their forward edges curved or angular and their rear faces constructed so as to allow of a close adjustment to the forward face of the pressing roller without coming into contact therewith. The above described frame being in readiness at one side of the table, the molten glass is then poured comparatively evenly upon the table and the wire gauze or netting x, preferably previously heated to the desired temperature, is laid or applied upon the surface of the molten glass, which immediately adapts itself to the wire, tending to partially embed or cover the meshes; and at the same time the surrounding molten glass consequently raises the temperature of the wire to a high degree before it is subsequently forced to the center of the glass; the frame is then traversed across the same, moving in the direction of the arrow, Fig. 1, and the wire netting is forced down into the glass by the blades, h, to a point about midway between the opposite faces of the resultant sheet, and immediately following the pressing blades the roller, or rollers, D, close the remaining openings formed by the entrance of the wire and the grooves made by the passage of the blades, so that a finished sheet is rapidly formed at but slight expense and without the danger of the glass cooling between operations.

It is not essential that the wire should be centrally located within the glass, but it may be provided, if desired, nearer one face than the other, and for some purposes the wire may be merely embedded in one of the faces of the glass to the depth, approximately, of the thickness of the wire. In such cases the smoothing roller would operate to embed the wire without other depressing device and also to compress and smooth the glass at the same operation.

Various other means of carrying my invention into effect will readily suggest themselves to persons skilled in the art.

Having thus described my invention, what I claim, and desire to secure by Letters Patent, is—

1. The process herein described of manufacturing glass consisting in first pouring out the molten glass upon a table in sufficient quantity to form a sheet, second laying a sheet of wire netting upon the surface of the molten glass and thereby heating the sheet to a high degree of temperature by contact with the molten glass and allowing the wire to partially embed itself and to partially conform to the surface of the poured glass by its own weight, and finally forcing the wire beneath the surface of the glass and rolling the glass, substantially as described.

2. The herein described process of embedding wire netting into glass, said process consisting in laying the wire upon the glass in lengths preliminarily to embedding, then drawing a series of embedding plates across the surface of the wire and thus forcing it beneath the surface of the molten glass toward the center of the sheet and then rolling the glass, substantially as described.

In witness whereof I have hereunto set my hand this 5th day of October, A. D. 1893.

FRANK OVERN.

Witnesses:
JOHN E. PARKER,
H. GORDON McCOUCH.